United States Patent Office 3,529,095
Patented Sept. 15, 1970

3,529,095

TELECOMMUNICATION SWITCHING ARRANGEMENT EMPLOYING SINGLE-WIRE TWO-WAY SIGNALLING SYSTEM

Bloomfield James Warman, London, England, assignor to Associated Electrical Industries Limited, London, England, a British company Filed June 12, 1967, Ser. No. 645,110
Claims priority, application Great Britain, June 22, 1966, 27,966/66
Int. Cl. H04m *3/22;* H04q *3/00*
U.S. Cl. 179—18 3 Claims

ABSTRACT OF THE DISCLOSURE

In an automatic telecommunication switching system, a cross-point switching network which affords 2-wire working connecting paths through itself is arranged to provide 4-wire working connecting paths by the establishment of two 2-wire working connecting paths in parallel. A single wire two-way signalling system provides a switching system requiring only eight wire connections instead of nine, so that only two four-connection cross-point switching arrangeemnts need be operated in parallel to provide the necessary connections. The eight wire connections are set up contemporaneously.

CROSS-REFERENCES TO RELATED PATENTS

British patent specifications 917,017, 999,945, 989,336 and 1,056,304 which correspond respectively to U.S. Pat. Nos. 3,129,293; 3,214,524; 3,272,924; and 3,420,962, are referred to in the disclosure.

BACKGROUND OF THE INVENTION

This invention relates to automatic telecommunication switching systems.

In a telecommunication switching system involving 4-wire working (that is, working in which separate "go" and "return" pairs of communication wires are provided for transmission in opposite directions) it may be necessary to switch not only connections corresponding to these four wires but also an associated test or private wire connections (P-wire), a pair of separate holding wire connections, one for each communication pair, and at least one signalling wire connection for transmitting signals such as on-hook and off-hook signals and dialling impulse signals. In systems involving 4-wire working the provision of such signalling wire connections may be necessary because it is not possible to pass these signals over the communication wire connections.

By using, as will be described, an electrical signalling arrangement which enables a single signalling wire connection to be used for signalling in both directions in respect of 4-wire working, there is avoided the need for providing a separate signalling wire connection for each transmission direction, thereby facilitating 4-wire working using only eight connections instead of a total of nine connections which would otherwise be required. Eight connections can readily be switched in two groups of four, for instance by duplicating and operating in parallel the four-connection cross-point switching arrangement described in U.S. Pat. No. 3,129,293.

The present invention is concerned with the realisation of arrangements for duplicating and operating in parallel four-connection (or other multi-connection) cross-point switching arrangeemnts in order to achieve 4-wire working, the invention having application in telecommunication switching systems of the character comprising a switching network composed of a plurality of multi-(e.g. four) connection cross-point switching arrangements which are arranged in one or more switching ranks or stages and are operable to establish connecting paths between terminals at one side of the switching network and link circuits at the other side of the network. One form of telecommunication switching system of this character is described in U.S. Pat. No. 3,214,524. In a telecommunication switching system of this character a communication path through the switching network between two sets of terminals comprises a first connecting path extending from one of the sets of terminals through operated cross-points of the cross-point switching arrangements to one side of a link circuit and a second connecting path extending from the other side of the link circuit back through further operated cross-points of the cross-point switching arrangeemnts to the other of the sets of terminals. The cross-points afford for any communication path to be established a sufficient number of wire connections appropriate for 2-wire working (that is, working in which a single pair of communication wires is provided for transmission in both directions). For 2-wire working, at least an associated test or private wire connection and also, possibly, a holding wire connection would be required in addition to the pair of communication wires.

SUMMARY OF THE INVENTION

According to the present invention, in its broadest aspect, in a telecommunication switching system of the character specified certain cross-point switching arrangements of the switching network are allocated for a 4-wire working facility which involves twice the number of wire connections required for 2-wire working, the cross-points of the cross-point switching arrangements which are thus allocated affording partial 4-wire working connecting paths for one direction of transmission between sets of terminals to which circuits appropriate for 4-wire working are connected and link circuits also appropriate for 4-wire working, cross-points of other cross-point switching arrangeemnts of the network affording partial 4-wire working connecting paths for the other direction of transmission, which latter cross-points are arranged for operation contemporaneously with those affording the first mentioned partial 4-wire connecting paths, so that two such partial paths in parallel complete a 4-wire working connecting path through the network. Preferably, the cross-points of said other cross-point switching arrangeemnts afford selectively either the partial 4-wire working connecting paths concerned or the usual 2-wire working connecting paths.

Hereinafter, for the sake of convenience, the 2-wire working connecting paths will be referred to as primary paths, and the partial 4-wire working connecting paths afforded by the cross-points of the cross-point switching arrangements allocated for the 4-wire working facility will be referred to as secondary paths.

In a contemplated application of the invention the switching network would be composed of cross-point switching arrangements having four-connection cross-points, for instance as described in U.S. Pat. No. 3,129,293. Each primary path can then be a four-connection path comprising a pair of communication wires, an associated test or private wire and a holding wire. The primary paths are thus suitable for the establishment of communication paths for 2-wire working. Likewise, each secondary path can be a four-connection path comprising a pair of communication wires and two further wires. By arranging that one of these further wires is a holding wire and the other a signalling wire used for signalling in both directions, secondary paths can be combined with primary paths to provide connecting paths suitable for the establishment of communication paths for 4-wire working through the switching network. Thus it becomes possible to use two four-connection paths (one primary path and one secondary path) in parallel to form a connecting path for 4-wire working, but without the necessity to make any wiring connections between the two four-connection paths. The secondary path forming part of a four-wire working connecting path need only be coupled to the appropriate marker (control circuit) connections to which is coupled a primary path forming the other part of the four-wire working connecting path. The duplicate marking and operation of the cross-points through which the primary and secondary paths extend can then be effected in a manner generally similar to that described in U.S. Pat. No. 3,129,293.

The present invention enables a 4-wire working capability to be added to any 2-wire working switching network of a telecommunications switching system of the character specified, either during initial manufacture and installation, or subsequently, merely by using certain of the cross-point switching arrangements of the network for said secondary paths or providing additional cross-point switching arrangements for these paths. Furthermore, no modification of the primary paths for 2-wire working is necessary, and 4-wire working capability need not be conferred on all the primary paths.

Normally, the only communications paths to be established through the switching network in respect of 4-wire working would be "through" paths affording connection between incoming junction circuits and outgoing junction circuits. This is because if an incoming 4-wire working connection is to terminate locally it would be converted to a 2-wire working connection by means of a hybrid in the incoming junction circuit as a result of class of service signals applied to the incoming junction circuit. However, if only a minority of incoming 4-wire working connections are expected to terminate locally, then it may be considered uneconomic to provide all incoming junction circuits with hybrids. In this circumstance, it may be arranged that an incoming 4-wire working connection is extended through the switching network by means of a suitable 4-wire working "through" path to a 4-wire working to 2-wire working hybrid converter circuit so that the connection effectively leaves the switching network still as a 4-wire working connection and is then returned as a 2-wire working connection to terminate locally. Outgoing 2-wire working connections which require 4-wire working outgoing junctions can be similarly extended through the switching network by means of a 2-wire working connection to a 2-wire working to 4-wire working hybrid converter circuit so that the connection effectively leaves the switching network still as a 2-wire working connection and is then returned as a 4-wire working connection to be extended through the switching network again over a 4-wire working "through" path to an outgoing junction circuit. With the switching network of a telecommunication switching system of the character specified organised in sections as described in U.S. Pat. No. 3,214,524 this concept of the sectionalisation of a switching network being in accordance with U.S. Pat. No. 3,272,924, the hybrid converter circuits may be essentially planar transfer type circuits as described in U.S. Pat. No. 3,420,962.

Consider now the application of the invention to a telecommunication switching system in which there is provided a switching system of the character specified and in which, the switching network in addition to having sets of terminals connected to the lines extending out of the system (i.e. local and junction lines) also has other sets of terminals connected to items of auxiliary equipment (including registers) which are arranged in digitally identifiable groups from which individual items can be selected for use on a call, as and when required, and wherein for a call between calling and called lines connected to the switching system common control equipment of the system establishes at least two communication paths through the switching network between two sets of terminals thereof, and each path following a loop which extends through the switching network to a link circuit and back through the switching network and at least one of these paths serving to establish connection between one of said items of auxiliary equipment selected from its group for use on the call and either one of the lines involved in the call or another item of auxiliary equipment selected for the call.

For this application it would be arranged that originating 2-wire working connections would have registers provided ot 2-wire working terminations, but incoming junction 4-wire working connections would have registers provided at 4-wire working terminations to which they would have access by way of 4-wire working "through paths." This is necessary to provide inter-registering signalling on both "GO" and "RETURN" channels of 4-wire working connections, that is signalling between registers and associated senders during the establishment of calls. Such signalling can deal only with information derived from routing information and congestion condition, etc. encountered during call setting.

BRIEF DESCRIPTION OF THE DRAWINGS

In order that the invention may be more fully understood reference will now be made by way of example to the accompanying drawings of which.

DESCRIPTION OF THE PREFERRED EMBODIMENT

Figure 1:
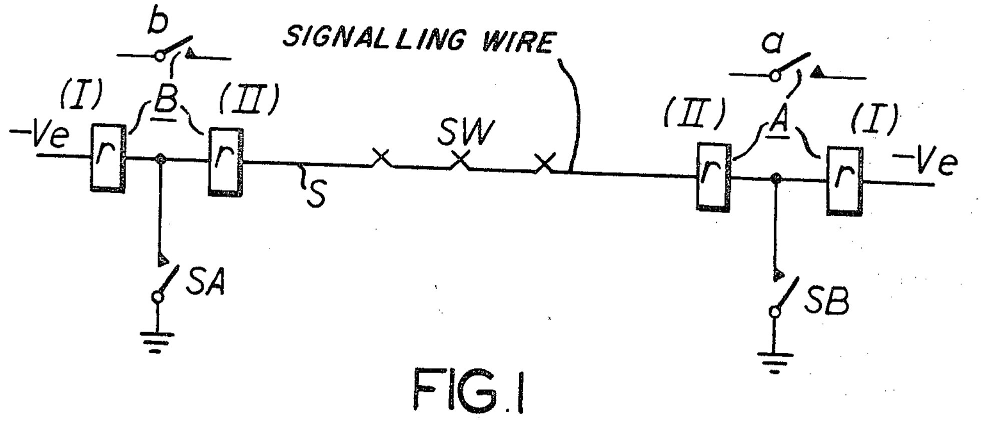
FIG. 1 is a dagrammatic representation of an electrical signalling arrangement for signalling in both directions over a single-wire signalling path.

Referring firstly to FIG. 1, S is a single-wire signalling path establishable through a switching network SW, and it is required that operation of a switching device SA at one end of the signalling path shall be responded to by operation of a relay device A at the other end, and that likewise operation of a switching device SB at this latter end shall be responded to by operation of a relay device B at the fist end.

Each of the relay devices A and B has two windings I and II connected in series between the signalling path S and a source of potential indicated as *—ve*. Each of the switching devices SA and SB is connected between a source of different potential, indicated as earth, and the junction between the windings I and II of the relay (B or A respectively) at the same end of the signalling path S. Each relay device is designed to be more sensitive to energisation of its winding II (namely its winding on the signalling path side of the junction between its two windings) than to energisation of its winding I. The sensitivity ratio as between winding I and winding II of the relay device at each end is chosen to correspond to the ratio of the resistance of its winding I to the sum of the resistances of its own winding II and the two windings of the relay device at the other end. Thus, if, as would be preferred, all four relay windings have the same resistance *r*, each relay device would be designed to be three times more sensitive on its winding II than on its winding I, e.g. by having three times as many turns in II as in I. This preferred resistance and sensitivity relationship will be assumed for the following description of operation.

On operation (closure) of switching device SB (assuming SA to be unoperated), relay device A will be unaffected because of the differential action of the currents in its two windings. The current flowing through its three times more sensitive winding II in series with the two windings of device B will be one-third of that flowing through its winding I alone, so that the effects of these currents will be equal and opposite. The relay device B will be operated, however, by the one-third current flowing in its two windings in series. If the switching device SA had been or is subsequently operated, then full current flows in the windings I of both relays and both therefore operate. If SB is released while SA remains operated, relay B will release because of differential action of the currents that now flow in its two windings through SA, but relay A will remain operated by the one-third current flowing through its two windings in series.

It will be appreciated from the foregoing, that signals can in this way be transmitted in both directions along the signalling path S and that such signals can in effect pass each other along the path.

The switching devices may each comprise a so-called reed relay or, alternatively, a transistor having its collector connected to the junction between the windings of one pair, its emitter connected to earth, and its base arranged to receive a drive signal.

Figure 2:
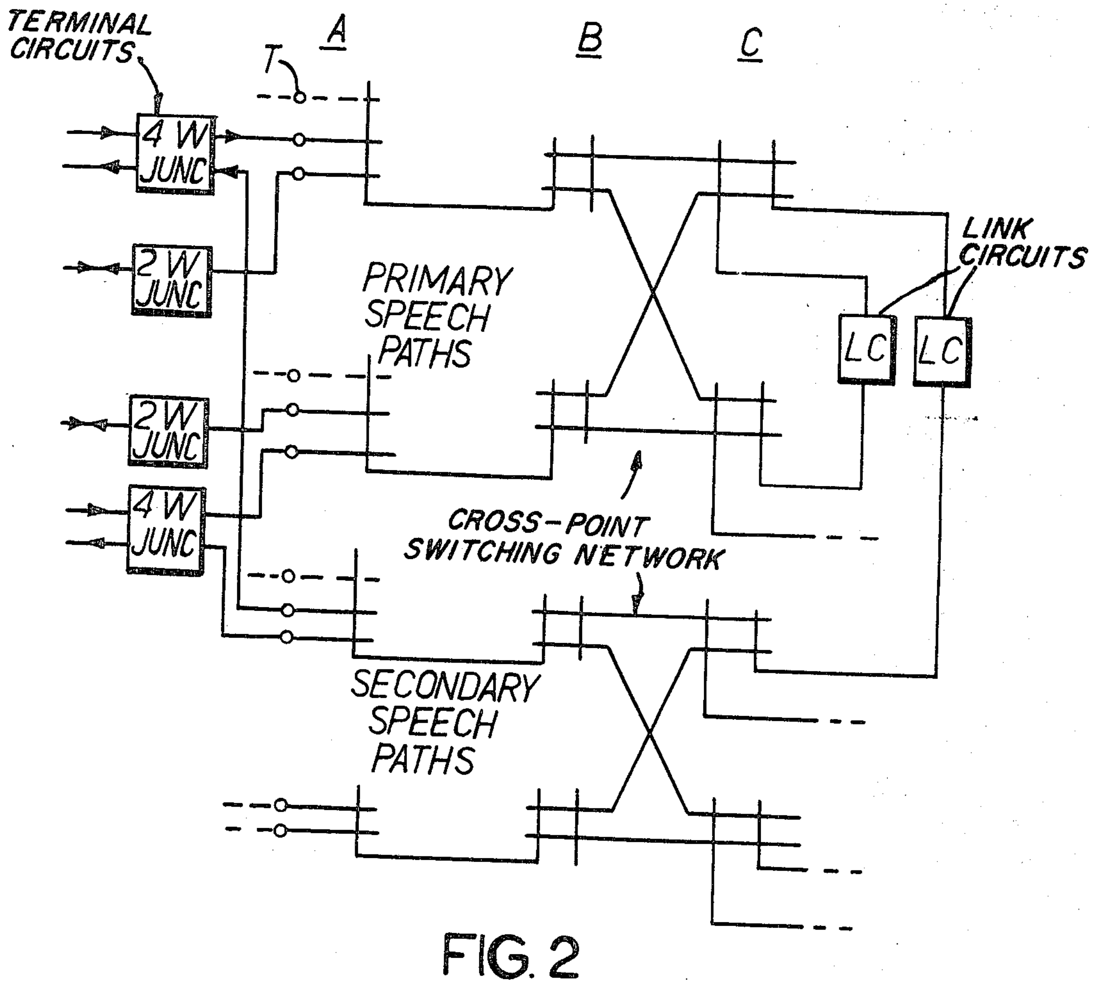
FIG. 2 shows in diagrammatic form a switching network including primary and secondary paths in accordance with the invention.

Turning now to FIG. 2, this shows in outline a co-ordinate cross-point switching network of the form described fully in U.S. Pat. No. 3,214,524. This switching network has three switching stages A, B and C, with sets of terminals T connected to the horizontals of the A stage switches and link circuits LC connected to the horizontals of the C stage switches. Terminals circuits are connected to the sets of terminals T, and for the purposes of the present invention terminal circuits in the form of 2-wire junctions and 4-wire junctions only are represented. In accordance with the present invention the cross-points of the switching network afford primary speech paths which serve 2-wire working terminal circuits and some of which also serve 4-wire working terminal circuits for one direction of transmission. Other cross-points of the switching network afford secondary speech paths which serve 4-wire working terminal circuits for the other direction of transmission.

Figure 3:
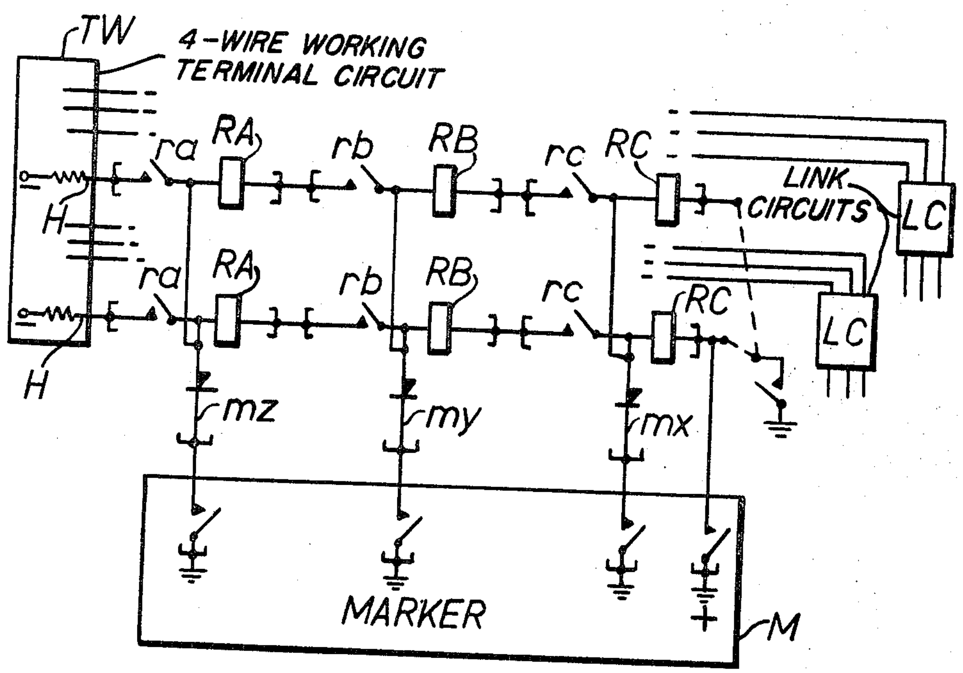
FIG. 3 illustrates the duplicate marking and operation of cross-points through which primary and secondary paths extend.

FIG. 3 illustrates the duplicate marking and operation of cross-points through which a primary path and a secondary path extend, these two paths together providing a 4-wire working path between a 4-wire working terminal circuit TW and two linking circuits LC. A similar 4-wire working connecting path (not shown) would extend from the other side of the linking circuits LC through another pair of primary and secondary paths to another terminal circuit. Each primary and secondary path comprises four conductors of which only the hold conductor H for each path is shown fully. Each hold conductor H includes in series the cross-point relays RA, RB and RC of the cross-points through which the path concerned extends, together with respective normally-open contacts *ra*, *rb* and *rc* of these relays. A marker M controls the setting-up of the two paths concurrently by contemporaneous operation of corresponding cross-point relays of the two paths. To this end, marking leads *mx*, *my* and *mz* are connected in both paths to the junction of respective ones of the cross-point relays and their contacts. The marking operations for the establishment of the paths are described fully in U.S. Pat. No. 3,129,293, the only difference in the present instance being the connection of the marking leads to both paths to effect the contemporaneous operation of the corresponding cross-points in the two paths.

Figure 4:
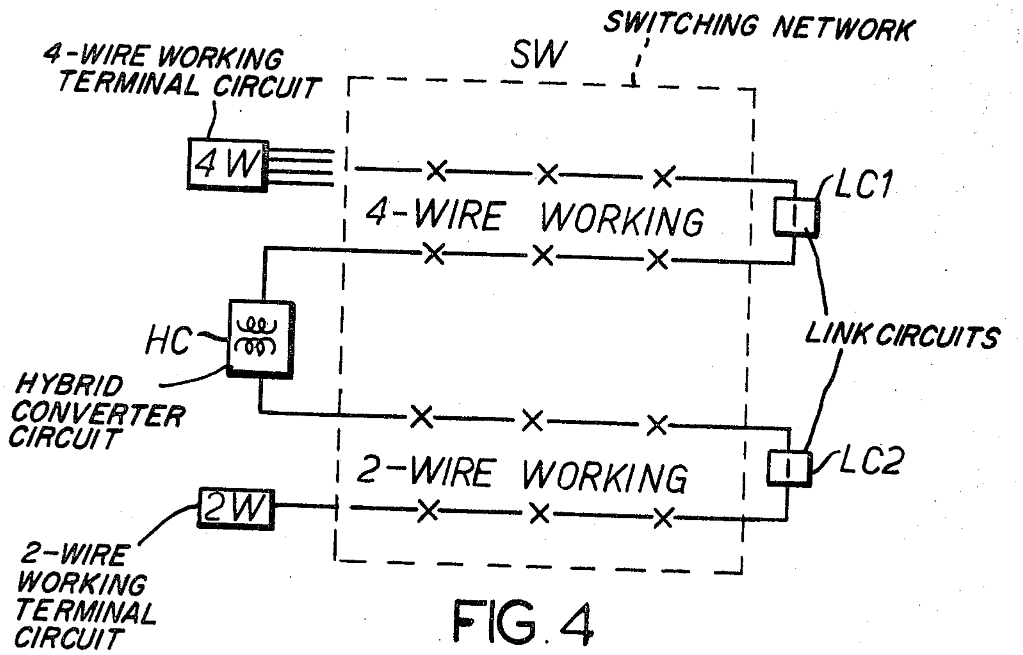
FIG. 4 illustartes the conversion from 2-wire working to 4-wire working and vice-versa.

FIG. 4 illustrates the conversion from 2-wire working to 4-wire working and vice-versa. An incoming 4-wire working connection from a 4-wire working terminal circuit 4W is extended through the switching network SW by means of a 4-wire working "through" path, including link circuit LC1, to a 4-wire working to 2-wire working hybrid converter circuit HC so that the connection effectively leaves the switching network SW still as a 4-wire working connection and is then returned as a 2-wire working connection which is extended through a network by means of a 2-wire working "through" path, including link circuit LC2, to terminate locally at a 2-wire working terminal circuit 2W. An outgoing 2-wire working connection from a 2-wire working terminal circuit 2W which requires connection to a 4-wire working terminal circuit 4W is similarly extended through the switching network SW in reverse. 2-wire working to 4-wire working and 4-wire working to 2-wire working hybrid converters are known in the telecommunications art.

I claim:

1. In a telecommunication switching system of the kind in which a cross-point switching network is connected between a plurality of 4-wire circuits on the one hand and a plurality of link circuits on the other hand to enable a first path having eight separate wires to be established through said network from a first 4-wire circuit to a pair of said link circuits and a second path having eight separate wires to be established through said network from the pair of link circuits to a second 4-wire circuit so that electric signals may be passed between the first and second circuits by way of the first and second paths, the improvement comprising a two-way signalling system utilizing only one wire of said second path through said switching network as a signalling wire and comprising a first electromagnetic relay having two windings, circuit means for connecting the two windings of the first relay in series between a point maintained at a first voltage and one end of said signalling wire, first switching means connected between the junction of the two windings of the first relay and a point maintained at a second voltage, a second electromagnetic relay having two windings, circuit means for connecting the two windings of the second relay in series between a point maintained at a third voltage and the other end of said signalling wire, and second switching means connected between the junction of the two windings of the second relay and a point maintained at a fourth voltage such that operation of the first switching means completes a circuit to operate the second relay without operating the first relay, operation of the second switching means completes a circuit to operate the first relay without operating the second relay, and the eight wire connections required for 4-wire working are set up contemporaneously.

2. A signalling system according to claim 1 wherein the first and third voltages are the same and the second and fourth voltages are the same.

3. A signalling system according to claim 2 wherein the second and fourth voltages are ground potential.

References Cited

UNITED STATES PATENTS 3,300,587 1/1967 Knight et al.

WILLIAM C. COOPER, Primary Examiner